United States Patent
Lemetayer et al.

(10) Patent No.: US 10,900,340 B2
(45) Date of Patent: Jan. 26, 2021

(54) SYSTEM FOR TREATMENT OF A MIXTURE FROM A PRODUCTION WELL

(71) Applicant: TOTAL SA, Courbevoie (FR)

(72) Inventors: Pierre Lemetayer, Pau (FR); Emmanuel Toguem N'Guete, Pau (FR)

(73) Assignee: TOTAL SA, Courbevoie (FR)

( * ) Notice: Subject to any disclaimer, the term of this patent is extended or adjusted under 35 U.S.C. 154(b) by 304 days.

(21) Appl. No.: 15/115,849

(22) PCT Filed: Jan. 30, 2015

(86) PCT No.: PCT/FR2015/050225
§ 371 (c)(1),
(2) Date: Aug. 1, 2016

(87) PCT Pub. No.: WO2015/114275
PCT Pub. Date: Aug. 6, 2015

(65) Prior Publication Data
US 2017/0009564 A1    Jan. 12, 2017

(30) Foreign Application Priority Data

Jan. 30, 2014   (EP) .................................... 14290014

(51) Int. Cl.
*E21B 43/34*   (2006.01)
*E21B 43/38*   (2006.01)
(Continued)

(52) U.S. Cl.
CPC .......... *E21B 43/34* (2013.01); *B01D 17/0217* (2013.01); *B01D 17/045* (2013.01);
(Continued)

(58) Field of Classification Search
CPC ...................................................... E21B 43/34
See application file for complete search history.

(56) References Cited

U.S. PATENT DOCUMENTS

| 6,378,608 B1 | 4/2002 | Nilsen |
| 2005/0006086 A1* | 1/2005 | Gramme ............ B01D 17/0208 |
| | | 166/105.5 |

(Continued)

FOREIGN PATENT DOCUMENTS

| FR | 2976031 A1 | 12/2012 |
| WO | WO 01/65064 | 9/2001 |

OTHER PUBLICATIONS

International Search Report and Written Opinion for PCT/FR2015/050225, dated Sep. 21, 2015, 10 pages.
(Continued)

*Primary Examiner* — Peter Keyworth
(74) *Attorney, Agent, or Firm* — Patterson Thuente Pedersen, P.A.

(57) ABSTRACT

The present invention relates to a system for treatment of a mixture from a production well, said mixture comprising a first aqueous liquid and a second oily liquid, the treatment system comprising an extraction tube installed in said well and capable of conducting said mixture from the bottom of said well, a separator capable of separating the first liquid from the second liquid in said mixture, a first end of said tube being connected to the separator, a first injection means capable of injecting a first product into said tube, said first product being capable of improving the flocculation and coalescence of the second fluid in the mixture. Any diameter of the tube between said first end of the tube and a second end of said tube lies in an interval of 10% around a predetermined diameter.

14 Claims, 1 Drawing Sheet

(51) Int. Cl.
*B01D 17/02* (2006.01)
*B01D 17/04* (2006.01)
*E21B 43/40* (2006.01)

(52) U.S. Cl.
CPC ............ *B01D 17/047* (2013.01); *E21B 43/38* (2013.01); *E21B 43/40* (2013.01)

(56) References Cited

U.S. PATENT DOCUMENTS

| | | |
|---|---|---|
| 2009/0151953 A1 | 6/2009 | Brown et al. |
| 2009/0242490 A1 | 10/2009 | Hopper |
| 2012/0120769 A1 | 5/2012 | Onodera |
| 2013/0082010 A1* | 4/2013 | Al-Mulhim ............ C10G 33/08 210/767 |

OTHER PUBLICATIONS

English translation of International Search Report for PCT/FR2015/050225, dated Sep. 21, 2015, 3 pages.

* cited by examiner

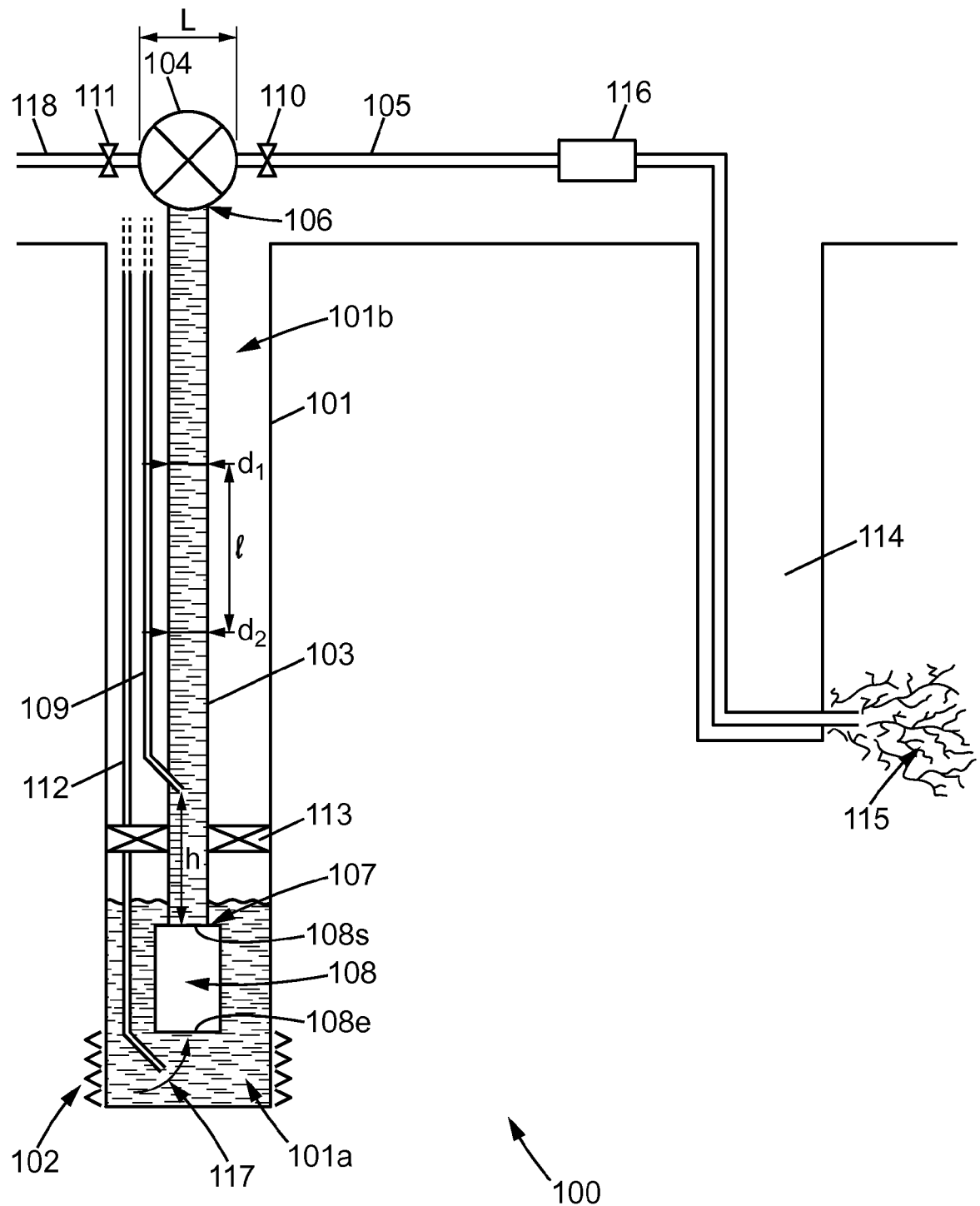

SYSTEM FOR TREATMENT OF A MIXTURE FROM A PRODUCTION WELL

RELATED APPLICATIONS

The present application is a National Phase entry of PCT Application No. PCT/FR2015/050225 filed Jan. 30, 2015, which claims priority from EP Patent Application No. 14 290 0104.1, filed Jan. 30, 2014, said applications being hereby incorporated by reference herein in their entirety.

FIELD OF THE INVENTION

This invention relates to the field of treating fluid extracted from an operating well, in particular in the hypothesis where this extracted fluid contains a water-oil mixture (i.e. water-hydrocarbon).

The separation of the water from the hydrocarbon during the operation of a well is an important point of attention in the general economy of the operation. Indeed, in the framework of many non-conventional wells, the aqueous portion of the fluid brought up from the production zone is becoming increasingly larger.

In addition, in particular in the framework of a well comprising a pump at the bottom of the well, the fluid coming up from the well can be relatively turbulent and the water-oil emulsion can be substantial (i.e. the size of the drops of oil in the water can be very fine) as such making any later oil/water separation more complex.

There is as such a need to propose a system for treating production fluid in order to simplify the water-oil separation.

SUMMARY OF THE INVENTION

This invention as such improves the situation.

To this effect, this invention proposes a system for treating a mixture from a production well, with said mixture comprising a first aqueous liquid and a second oily liquid, the system for treatment comprises:
- an extraction tube installed in said well and capable of conducting said mixture from a bottom of said well,
- a separator capable of separating the first liquid from the second liquid in said mixture, a first end of said tube being connected to the separator,
- a first injection means capable of injecting a first product into said tube, said first product being capable of improving the flocculation and the coalescence of the second fluid in the mixture.

Any diameter of the tube between said first end of the tube and a second end of said tube lies in an interval of 10% around a predetermined diameter.

In a particular embodiment, the separator can comprise a first evacuation for aqueous liquid, and wherein the system further comprises a nozzle able to regulate a flow rate of liquid exiting from said first evacuation.

Advantageously, the separator can comprise a second evacuation for oily liquid, and wherein the system further comprises a nozzle able to regulate a flow rate of liquid exiting from said second evacuation.

Furthermore, the largest dimension of the separator can be five times less the predetermined diameter.

In an embodiment of the invention, the system for treatment can further comprise:
- a bottom pump, said bottom pump comprising an inlet and an outlet, with the second end of said tube being connected to the outlet of said bottom pump,
- a second injection means capable of injecting a second active product on the water and oil interfaces in the mixture in a zone located upstream of the bottom pump with regards to a circulation of said mixture from the inlet of said bottom pump to the outlet of said bottom pump.

Advantageously, the second injection means can be capable of injecting a third anti-deposit product.

In particular, the bottom pump can be a hydraulic pump or a centrifugal hydraulic pump or an electric pump.

Furthermore, the predetermined diameter can be capable of maximising, for a given flow rate of mixture in said tube, an effect of flocculation and of coalescence of the oily liquid of said mixture in said tube.

In a particular embodiment of the invention, the separator can comprise a first evacuation for aqueous liquid, said evacuation being connected to an underground reservoir.

The separator can also comprise a first evacuation for aqueous liquid, said evacuation being connected to an underground reservoir and a pump installed on the surface can be capable of pressurising a liquid exiting from said evacuation for an injection of said exiting liquid into the underground reservoir.

As a supplement or as an alternative, the separator can comprise a first evacuation for aqueous liquid, said evacuation being connected to an underground reservoir, the bottom pump can be capable of pressurising a liquid exiting from said evacuation for an injection of said exiting liquid into the underground reservoir.

For example, the separator can be a cyclone separator.

In a particular embodiment, the separator can be an active separator of which an activation speed is independent from a speed of the bottom pump.

Advantageously, the separator can be installed on the surface or in the well.

A distance between a wellhead of said well and the separator can be less than 100 metres.

In an advantageous embodiment, the first injection means can be positioned in such a way that the injection of the first product is carried out in a first third of the tube comprising the second end of said tube.

For example, the first injection means can be positioned in such a way that the injection of the first product is carried out in a continuous portion of the tube comprising the second end of said tube, said continuous portion having a length less than 20 metres.

BRIEF DESCRIPTION OF THE DRAWINGS

Other characteristics and advantages of the invention shall appear when reading the following description. The latter is purely for the purpose of illustration and must be read with regards to the annexed drawings wherein:

FIG. 1 shows a particular embodiment of a system for treating a mixture from a production well according to the invention.

DETAILED DESCRIPTION OF THE DRAWINGS

FIG. 1 shows a particular embodiment of a system for treating a mixture from a production well according to the invention.

This system 100 for treatment is installed in a production well 101 drilled beforehand.

During operation, the production fluid contained in the reservoir infiltrates into the well 101 on the bottom of the well 101a and through perforations 102.

In order to extract the production fluid, it is often useful to install an extraction tube 103 in the well. This tube extends from the surface (i.e. from the wellhead) to the bottom of the well 101a or at the least, to a distance at which the production fluid exists.

For safety reasons and in order to be able to prevent any rising of fluid into the annular portion 101b, it is useful to install an insulation seal 113 (or packer) in the lower portion of the well, leaving as such as the only exit for the fluid, to the wellhead, the extraction tube 103.

If the well is an eruptive well, it is not necessary to install a pump at the bottom of the well in order to assist with the raising of the production fluid to the surface. In the case where the well is not eruptive (for example, in most of the so-called "non-conventional" wells, it is useful to connect to the extraction tube (for example at its bottom end 107) a pump 108. This pump is called "bottom pump". The pump 108 comprises an inlet 108e and an outlet 108s.

This pump can be in particular a hydraulic pump, a centrifugal hydraulic pump or encore an electric pump.

In the least, this pump is powerful enough to allow for raising the fluid from the pumping zone (i.e. from the inlet of the pump 108e) to the wellhead.

During the rising of the "water-oil" production fluid in the extraction tube, this fluid can have the aspect of an "emulsion". This phenomenon is reinforced by the use of a bottom pump. Indeed, due to the turbulence induced by the infiltration in the well, the cavitations, the modifications to the flow and the movement of the pump, the oil contained in the aqueous liquid tends to form droplets of small size during the rising in the tube.

In order to seek to separate the oil from the rest of the liquid, it is as such useful to install a "water-oil" separator 104 in this system. This separator 104 is capable of separating the oil from the rest of the second liquid in said mixture (i.e. the production fluid). This separator 104 is connected to the top end 106 of the extraction tube.

The separator 104 comprises an evacuation 105 for the non-oily liquid. A nozzle 110 (i.e. closing valve) makes it possible to regulate a flow rate of the exiting liquid through this evacuation 105.

This evacuation 105 can be connected to an underground reservoir 115 accessible, for example, via an old operating well 114 in order to store and evacuate this aqueous liquid.

The hydrostatic pressure of the column of aqueous liquid can be sufficient to apply a pressure able to inject this liquid into the reservoir 115. However, the reservoir 115 can also exert an excessive back-pressure and as such block the injection of the liquid in this reservoir 115.

So, it can be useful to add on the line 105 a surface pump 116 making it possible to pressurise the liquid evacuated via this line and cable of overcoming the back-pressure of the reservoir 115.

However, this pressurising is not necessarily carried out using a surface pump: the bottom pump 108 can also allow for this pressurising in the hypothesis where it is powerful enough and sufficiently sized for an injection of the liquid of the line 105 into the underground reservoir 115.

Likewise, this separator 104 comprises an evacuation 118 for oily liquid, provided with a nozzle 111 capable of regulating a flow rate of liquid evacuated by this evacuation 118.

The adjusting of the distribution of the withdrawing between the oil outlet and the water outlet (through the partial opening or closing of the nozzles) makes it possible to simply achieve a quality of water with a high degree of cleanliness: the risk of pollution via reinjection into a reservoir 115 is therefore greatly limited. In addition, it is possible to install on the evacuation line 105 a pollution sensor that makes it possible to warn an agent or to stop the injection in the case of presence (possibly traces) of oil in the liquid to be reinjected.

The separator 104 can be a cyclone separator, for example put into rotation using a device shared with the pump 108 (e.g. same hydraulic system, same drive shaft, etc.).

However, although the separator can be an active separator, it can be useful for the activation speed of the latter (e.g. rotation speed of an active cyclone filter) to be independent of the pumping speed of the bottom pump (e.g. activation speed depending on the density of the oil in the liquid, not on the flow rate of the liquid pumped).

Moreover, although FIG. 1 shows a separator 104 installed beyond the wellhead (i.e. on the surface), it can be useful to install it in the well in order to allow for an installation of the standard well safety mechanisms above the separator. Indeed, most often, safety devices create modifications in the diameter than can result in turbulent flows in the operating fluid and as such they can disturb/block the later separation of the oil contained in the operating fluid.

As such, it is advantageous that the separator used be compact in order to be able to introduce it without difficulty into the well: for example, the largest dimension (L) of the separator 104 can be five times less than the diameter of the tube 103.

It is for example possible to use the compact Optisep separator (U.S. Pat. No. 7,462,274 B2). The compactness of this device facilitates its resistance to pressure, simplifies the mounting and facilitates the operations at the wellhead. In addition, it is possible to regulate the cutting diameter (i.e. diameter beyond which the droplets of oil are separated) by a modification of the rotation speed of the separator.

In any case, it can be advantageous for the separator to not be excessively far away from the wellhead (for example, 100 m):
  if the separator is in the well, this makes it possible to prevent the separator from being too close to the pump or zones of turbulences of the well. As such, the system takes advantage of the coalescence and of the natural flocculation of the oil during its rising in the tube 103;
  if the separator is out of the well, this makes it possible to prevent a horizontal transport of the non-oily fluid and therefore not necessary for production.

In order to facilitate the separation of the oil and to increase the effectiveness of the separator 104, the system further comprises an injection tube 109 that makes it possible to inject a product into the extraction tube 103 in order to improve the flocculation and the coalescence of the oil in the production fluid.

Flocculation is the physical-chemical process during which suspended matter in a liquid agglomerates in order to form larger particles. The flocculent can be, for example, metal ions (iron, aluminium) or macromolecules (polyelectrolytes) in order to favour aggregation.

Coalescence is a phenomenon by which two identical, but dispersed substances tend to come together. The main phenomenon that comes into play is that the material optimises its surface under the action of the surface tension, in such a way as to reach a minimum of energy.

The tube 109 is advantageously placed to allow for an injection into the first third of the bottom tube of the tube 103 (i.e. third comprising the end 107 of the tube). This location allows the product that improves the flocculation and the coalescence of the oil to act for a long period of time during the rising of the production fluid. For example, the injection is carried out at a height h=20 m above the pump or from the bottom end of the tube 103.

Moreover, in order to prevent any effect of turbulence in the tube which would have for effect to control the flocculation or the coalescence, it is advantageous for no valve or narrowing to exit on the tube 103 between the pump and the separator 104. For the purposes of illustration, it can be advantageous that the diameter ($d_1$ or $d_2$) of the tube 103 does not move away more than a certain percentage (e.g. 5% or 10%) around a predetermined diameter over the entire height of the tube (i.e. from the interface 106 to the interface 107). It is also possible to limit the variation of the tube between the smallest diameter and the largest diameter over any sliding section of a predetermined length (e.g. l): as such, over any section of the tube of length l, the difference between the smallest diameter and the largest diameter does not exceed a certain percentage of the smallest or of the largest diameter.

The predetermined diameter can be capable of maximising, for a given flow rate of mixture in said tube, an effect of flocculation and of coalescence. Indeed, if the diameter is too small for a given flow rate, the speed of the fluid rising in the tube 103 will be substantial and the friction induced on the walls of the tube 103 can result in turbulent flows going against the flocculation or the coalescence. It is then advantageous to determine (algorithmically or experimentally) a diameter that allows for a flow at a "low" speed in the tube, for a given flow rate. If, inversely, the diameter is too large (and therefore if the speed of the fluid is too low), the particles of oil can have difficulties to meet and as such to group together. Then, a compromise can be found concerning the diameter in order to maximise the effect of coalescence and of flocculation of the oil: this compromise can depend on the production fluid and on the flow rate.

Advantageously, it is possible to provide an injection line 112 (passing for example through the seal 113) for an injection of an active product on the water-oil interfaces (for example a surfactant) and possibly an anti-deposit product in a zone located upstream (101a) of the bottom pump with regards to the circulation (arrow 117) of the production fluid to the surface.

This injection before the pump allows for an effective mixing of this product with the production fluid and makes it possible to maximise the subsequent separation.

It was observed experimentally that injecting this second product downstream of the pump did not make it possible to achieve as good a separation.

Moreover, injecting the product that improves the flocculation and the coalescence upstream of the pump (if it is used in the system) is not as good as injecting downstream as shown in FIG. 1.

Of course, this invention is not limited to the embodiments described hereinabove as examples; it extends to other alternatives.

The invention claimed is:

1. A system for treatment of a mixture from a production well, with said mixture comprising a first aqueous liquid and a second oily liquid, the system for treatment comprises:
   an extraction tube installed in said well and capable of conducting said mixture from a bottom of said well to the surface,
   a separator capable of separating the first liquid from the second liquid in said mixture, a first end of said extraction tube being connected to the separator,
   a first injection means capable of injecting a first product into said extraction tube, said first product being capable of improving the flocculation and the coalescence of the second fluid in the mixture,
   wherein, any diameter of the extraction tube between said first end of the extraction tube and a second end of said extraction tube lies in an interval of 10% around a predetermined diameter,
   wherein the separator comprises a first evacuation for aqueous liquid, said evacuation being connected to an underground reservoir accessible via an old operating well distinct from the production well,
   wherein the first evacuation for aqueous liquid comprises a nozzle able to regulate a flow rate of liquid exiting from said first evacuation,
   wherein the system for treatment further comprises:
      a bottom pump, said bottom pump comprising an inlet and an outlet, with the second end of said extraction tube being connected to the outlet of said bottom pump, and
      a second injection means capable of injecting a second active product on the water and oil interfaces in the mixture in a zone located upstream of the bottom pump with regards to a circulation of said mixture from the inlet of said bottom pump to the outlet of said bottom pump.

2. The system according to claim 1, wherein the separator comprises a second evacuation for oily liquid, and wherein the system further comprises another nozzle capable of regulating a flow rate of liquid exiting from said second evacuation.

3. The system according to claim 1, wherein a largest dimension of the separator is five times less than the predetermined diameter.

4. The system according to claim 1, wherein the second injection means is capable of injecting a third anti-deposit product.

5. The system according to claim 1, wherein the bottom pump is a hydraulic pump or a centrifugal hydraulic pump or an electric pump.

6. The system according to claim 1, wherein, a pump installed on the surface is able to pressurise a liquid exiting from said evacuation for an injection of said exiting liquid into the underground reservoir.

7. The system according to claim 1, wherein the bottom pump is capable of pressurising a liquid exiting from said evacuation for an injection of said exiting liquid into the underground reservoir.

8. The system according to claim 1, wherein the separator is a cyclone separator.

9. The system according to claim 1, wherein the separator is an active separator of which an activation speed is independent from a speed of the bottom pump.

10. The system according to claim 1, wherein the separator is installed on the surface.

11. The system according to claim 1, wherein the separator is installed in the well.

12. The system according to claim 1, wherein a distance between a wellhead of said well and the separator is less than 100 metres.

13. The system according to claim 1, wherein the first injection means is positioned in such a way that the injection of the first product is carried out in a first third of the extraction tube comprising the second end of said extraction tube.

14. The system according to claim 1, wherein the first injection means is positioned in such a way that the injection of the first product is carried out in a continuous portion of the extraction tube comprising the second end of said extraction tube, said continuous portion having a length less than 20 metres.

\* \* \* \* \*